Figure 1:
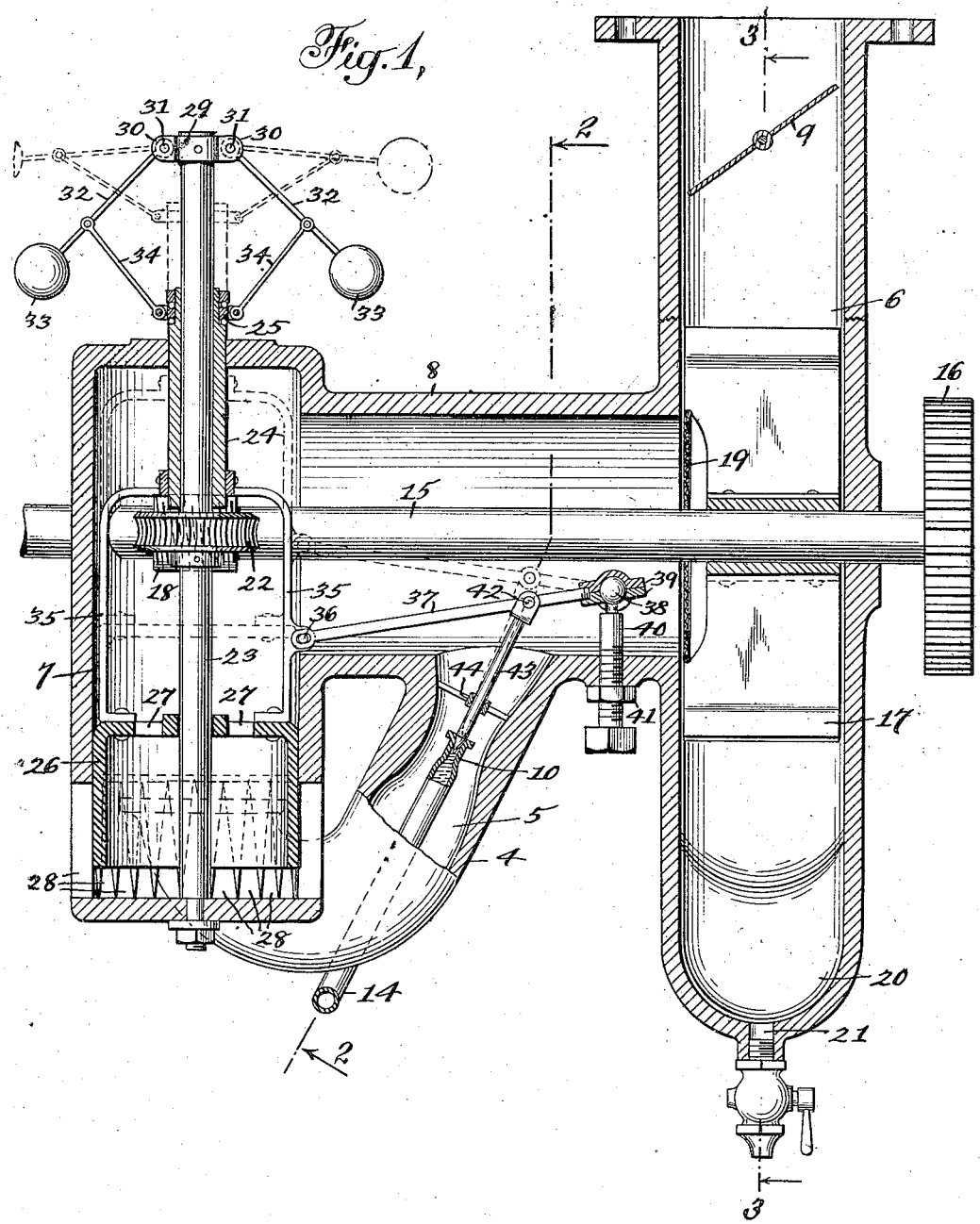

H. C. MERRIAM & L. M. YORK.
CARBURETER.
APPLICATION FILED MAR. 20, 1915.

1,154,530.

Patented Sept. 21, 1915.
2 SHEETS—SHEET 1.

WITNESSES
L. Hausstein
J. E. Larsen

INVENTORS
Harry C. Merriam
Lorne M. York
BY
ATTORNEYS

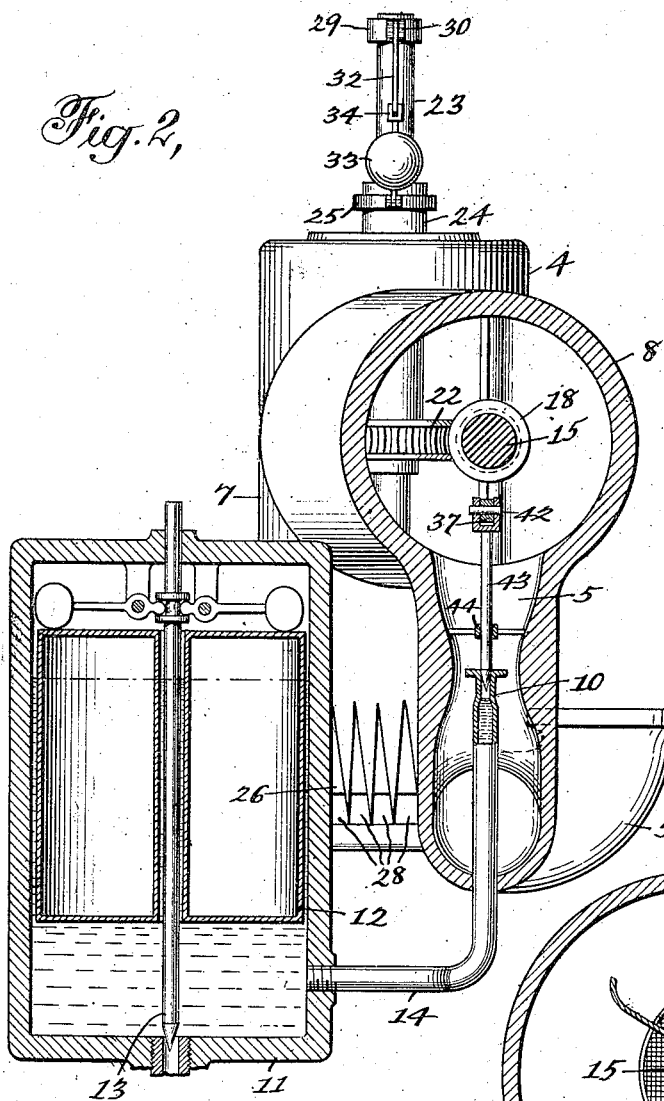
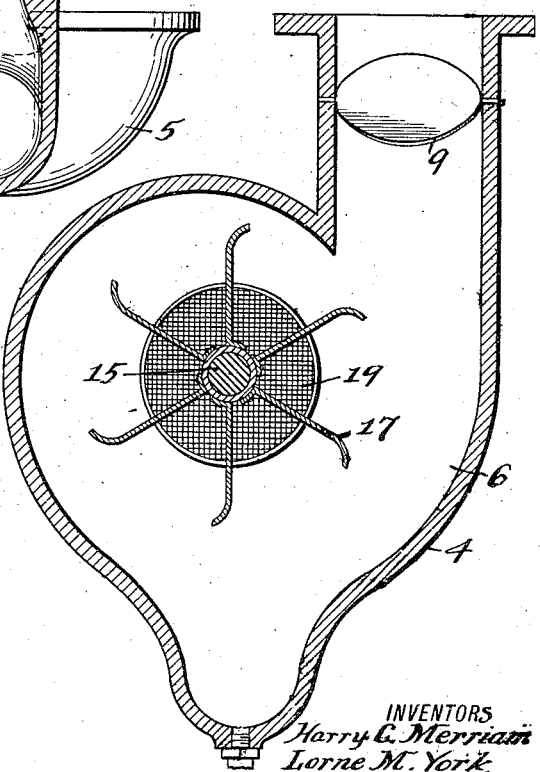

UNITED STATES PATENT OFFICE.

HARRY CARROLL MERRIAM AND LORNE MARTIN YORK, OF EDMONTON, ALBERTA, CANADA.

CARBURETER.

1,154,530.  Specification of Letters Patent.  Patented Sept. 21, 1915.

Application filed March 20, 1915.  Serial No. 15,725.

*To all whom it may concern:*

Be it known that we, HARRY C. MERRIAM, a citizen of the United States, and LORNE M. YORK, a British subject, of the Dominion of Canada, and residents of Edmonton, in the Province of Alberta, Dominion of Canada, have invented certain new and useful Improvements in Carbureters, of which the following is a specification.

Our invention relates to carbureters for internal-combustion engines, and one of the main objects thereof is to provide means therein for supplying the fuel mixture to the engine under pressure, thereby insuring a full charge of fuel for each cylinder, especially at high speeds, and practically eliminating the friction in the manifold.

A further object is to accomplish this result by means of a fan interposed between the spray nozzle and the intake manifold, said fan having the further function of vaporizing the mixture and separating the impurities therefrom, as in low gravity gasolenes.

A further object is to provide a screen for assisting in these last named results.

A further object is to provide means under the control of the fan actuating means for supplying auxiliary air to the intake manifold as the speed of the engine increases and in desired degree.

A further object is to provide means controlled by said fan actuating means for increasing the fuel supply in the degree of engine requirement; and further objects are to provide such devices which are simple in construction and maintenance, readily adjustable to meet different conditions, not likely to get out of order to require repair, small, compact, and comparatively inexpensive.

Our invention is fully described in the following specification, of which the accompanying drawings form a part, in which like reference characters refer to like parts in each of the views, and in which:—

Figure 1 is a vertical, longitudinal, section taken through a carbureter constructed in accordance with our present invention; Fig. 2 is a section taken on the line 2—2 of Fig. 1; and Fig. 3 is a reduced section taken on the line 3—3 of Fig. 1.

In the drawings forming a part of this application we have shown a present preferred form of embodiment of our invention, comprising a casing 4 divided into three compartments, 5, 6, and 7, hereinafter referred to as the main air supply, the fan, and the auxiliary air supply, compartments, the last two of which are joined by a tubular section 8 into which the main air supply compartment opens, and the second of which, the fan compartment 6, communicates with the manifold intake, not shown, this communication being controlled by a butterfly valve 9, or equivalent.

Within the main air supply compartment 5 is arranged the fuel spray nozzle 10 leading from the float chamber 11, Fig. 2, in which is arranged a float 12 controlling a valve 13 in turn controlling the supply of the liquid fuel from the tank, not shown, the connection between the nozzle 10 and the float chamber being by means of a pipe 14.

Journaled in the casing 4 is a shaft 15 which is power driven, as by a pinion 16 geared to the drive shaft of the engine in any suitable manner, not shown, said shaft carrying a fan 17 within the compartment 6, and a worm 18 within the compartment 7, and we provide a screen 19 upon the blades of the fan 17 to control the passage of air from the tubular section 8 to the fan compartment 6. The fan 17 serves the two purposes of forcing the mixture passed through the screen 19 to the manifold intake under pressure, and of breaking up the fuel into vapor, but we have found that it acts as a cushion against any sudden demands made upon the carbureter and thus avoiding the common choking or starving experienced with the conventional carbureters.

In the bottom of the fan compartment 6 is a catch-basin 20 and a controlled outlet 21 for the impurities extracted from the mixture by the fan, this fan effect being surprisingly great with low gravity gasolenes, and the fan therefore has a cleansing and purifying effect as well as that of forcing the mixture to the manifold intake under pressure.

The worm 18 is enmeshed with a worm gear 22 which is keyed upon a vertical shaft 23 journaled in the bottom of the compartment 7 and in a sleeve 24 in turn journaled in the top of said compartment, said sleeve having a collar 25 revolubly held at the upper end thereof, outside of the casing 4. The sleeve 24 carries a piston 26 at the lower end thereof of bell-shape and ported at 27, and adapted to open or close communication with the atmosphere through a plurality of inverted V-shaped slots 28 in the lower part of the wall of the compartment 7, the higher said piston is moved, the more air being admitted to and through the ports 27, as will be seen, but in gradually diminishing increase of volume because of the gradual narrowing upwardly of the air admission slot 28.

Secured to the top of the vertical shaft 23 is a collar 29 provided with diametrically arranged ears 30 carrying pins 31 serving as pivots for two arms 32 provided with weights 33 at their ends, and said arms are pivotally linked to the collar 25 of the sleeve 24 by means of links 34, whereby a construction similar to a conventional steam engine governor results. As the speed of the rotation of the shaft 23 increases or decreases, the sleeve 24 is moved upwardly or downwardly, thus moving the piston 26 and thereby increasing or decreasing the amount of auxiliary air admitted through the slots 28.

The sleeve 24 is connected to the piston 26 by means of spider-legs 35 to one of which is pivoted, at 36, a lever 37 fulcrumed upon a ball 38, by means of clamps 39 forming a socket for said ball, on the inner end of a screw 40 threaded in the lower wall of the tubular extension 8 and locked in adjusted position by means of a lock-nut 41. Pivoted to this lever 37, at 42, is a needle-valve 43 for the spray-nozzle 10, moving in a guide 44, and it will be seen that, in the upward and downward movement of the sleeve 24 by means of the governor weights 33, the needle-valve 43 is correspondingly raised and lowered, thus increasing or decreasing the amount of liquid fuel passing through the nozzle 10 to be mixed with the air in the compartment 5 primarily, and secondarily with the auxiliary air through the piston 26.

It will thus be seen that the speed of the engine automatically controls the character of the mixture delivered to its cylinders; this character of mixture is under control by means of the adjusting screw 40; the mixture is filtered and broken up by the screen 19; the mixture is vaporized and purified by means of the fan 17; and the purified mixture is delivered to the cylinders under pressure guaranteeing a full charge for each cylinder and accommodating the supply to the demand, sudden or constant.

Our invention is simple though well adapted to the purpose for which it is designed and, while we have shown a present preferred form of embodiment, we may make changes thereover, within the scope of the following claims, without departing from the spirit thereof or sacrificing its advantages.

Having fully described our invention, what we claim as new, and desire to secure by Letters Patent, is:—

1. In combination with the manifold intake of an internal combustion engine; a carbureter, comprising a liquid fuel supply, a main air supply, a fan for mixing said fuel and air and delivering the mixture to said manifold intake under pressure, means for actuating said fan, and means actuated by said fan actuating means for providing an auxiliary air supply in increasing quantity as the speed of the engine increases.

2. In combination with the manifold intake of an internal combustion engine; a carbureter, comprising a liquid fuel supply, a main air supply, a shaft, means for actuating the same, a supplemental shaft in operative connection with said first named shaft, a sleeve slidable on said supplemental shaft, speed controlled means for moving said sleeve, a piston carried by said sleeve, and a housing for said piston provided with tapered openings therethrough controlled by said piston.

3. In combination with the manifold intake of an internal combustion engine; a carbureter, comprising a casing, a liquid fuel supply pipe, a main air supply, a shaft, means for actuating the same, a piston controlling said air supply, means operable by said shaft for moving said piston, a valve for said fuel supply pipe, a pivoted lever, in pivotal connection with said piston operating means, and in pivotal connection with said fuel control valve, and means for adjusting the pivotal support of said lever to vary the relationship between said fuel supply pipe and said valve therefor.

4. In combination with the manifold intake of an internal combustion engine; a carbureter, comprising a casing divided into three compartments, one of which is the air supply, another of which connects with said intake, and the third of which joins said first two, an air control piston in one compartment, a fan in said second compartment, a liquid fuel pipe in said third compartment, and means for simultaneously opening said air and said fuel supply in the degree of increase in speed of said fan.

In testimony whereof we have signed our names to this specification in the presence of two subscribing witnesses.

HARRY CARROLL MERRIAM.
LORNE MARTIN YORK.

Witnesses:
  Geo. S. Montgomery.
  M. C. Murray.